2,894,018

DI(LOWER ALKYL)-MONO(α-PHENYL-β-CAR-BALKOXY-VINYL) PHOSPHATE ESTERS

Walter Lorenz, Wuppertal-Elberfeld, Germany, assignor to Farbenfabriken Bayer Aktiengesellschaft, Leverkusen, Germany, a corporation of Germany No Drawing. Application July 16, 1957
Serial No. 672,122

1 Claim. (Cl. 260—461)

This invention relates to and has as its objects new and useful phosphoric acid esters as well as their preparation.

It has been found that phosphoric acid esters of the general formula

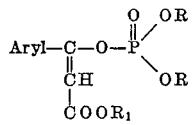

wherein R and $R_1$ denote an alkyl, aryl or aralkyl radical, distinguish themselves by an excellent insecticidal action. Besides a good action on plant lice they have a very good action on larvae of flies or gnats.

The production of these compounds may be carried out by known methods, for example by conversion of sodium aroyl esters with dialkyl-phosphoric acid chlorides.

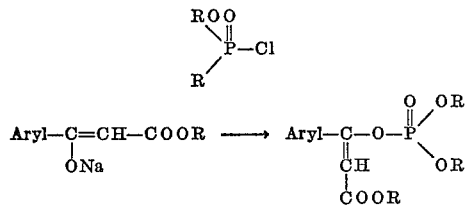

This method for the corresponding alcoyl esters has been described e.g. in Bios Final Report 714, 53 (1947).

It is, however, also possible to react the derivatives of haloaroyl-acetic ester with trialkyl phosphites. It is surprising that there are thereby obtained not the corresponding phosphonic acid esters, but by re-arrangement the same phosphoric acid esters as they are obtainable from the reaction of sodium aroyl esters with dialkyl-phosphoric acid halides

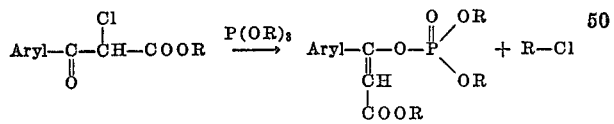

The last mentioned process is described e.g. by Arbuzov in J. Chem. (Russ.) 20 (82) 1468–1477, see also Chem. Abstracts 42, 4523–4524.

Compared with the compound known from Bios Final Report No. 714 in which instead of an aryl radical there is a methyl group (which is derived from acetoacetic ester), the aryl compounds have a markedly low inhalation toxicity which is of decisive importance for the practical application of phosphoric acid esters which are known to be poisonous.

Moreover, the phosphoric acid esters according to the invention are intended to be applied against the boll weevil (a cotton pest) thereby attaining a persistent protection the effect of which is for example three times that of the acetoacetic derivative.

The phosphoric acid esters according to the invention may be applied in the usual form, i.e. in admixture with a liquid or solid diluent including, if so desired, an emulsifier and other additives. The compounds according to the invention may be used especially for the protection of cotton seed. In this case the young cotton plants are immune against infestation by the boll worm (*Heliotis armigera*).

The following description may be given for the purpose of specifically illustrating the utility of the inventive compounds.

The diethyl phosphoric acid ester of the enol form of the benzoyl ester acid ethyl ester was sprayed in the form of an aqueous emulsion by use of the same amount of benzyl-hydroxy-diphenyl (0.1%) polyglycol ether on cotton plants at a concentration of 0.1% active ingredient. The mixture of emulsifier and active ingredient was pre-prepared and then diluted with water to a 0.1% emulsion. During the tests, the treated plants were kept in cages in the open air and infested with 100–125 plant lice and red spiders respectively, and with a smaller number of boll weevils. The mortality of plant lice and red spiders was assayed after three days and of boll weevils after five days. The results are listed in the following table. For comparison, the test was also carried out with the diethyl phosphoric acid ester of the enol form of acetoacetic acid ethyl ester.

| | | mortality in percentages | | |
|---|---|---|---|---|
| | kg./Ha | boll weevil | cotton plant lice | red spider |
| diethyl phosphoric acid ester of the enol form of the aceto acetic ester | 2.0 | 14 | 10 | 100 |
| | 1.0 | | | 100 |
| | 0.5 | | | 80 |
| diethyl phosphoric acid ester of the enol form of the benzoyl acetic ester | 2.0 | 94 | | |
| | 1.0 | 82 | | |
| | 0.5 | 42 | 100 | 100 |
| | 0.25 | 32 | 97 | 98 |
| | 0.125 | 12 | 83 | 100 |
| | 0.062 | | 47 | 100 |
| | 0.031 | | | 94 |
| | 0.016 | | | 64 |
| | 0.008 | | | 30 |

The following example may illustrate this invention, without limiting it, however, thereto.

*Example*

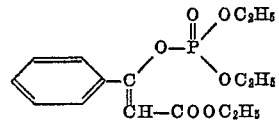

44 grams of the ethyl ester of α-chlorobenzoyl-acetic-acid are heated on the water bath to 70–90° C. in 200 cc. of toluene. 40 grams of triethyl phosphite are added dropwise at this temperature. The evolution of chloroethylene ceases after heating for about 1 hour. The new ester of the above formula shows a B.P. 1.5 mm./172–173° C. and is obtained in a practically quantitative yield by distillation.

If the equivalent of trimethyl phosphite is used in the same reaction the corresponding dimethyl ester of the following formula is obtained (B.P. 0.5 mm./156–157° C.):

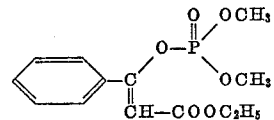

Using the equivalent molecular amounts of the methyl ester of α-chlorobenzoyl-acetic acid and trimethyl phosphite there is obtained the following ester

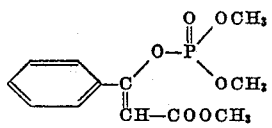

It has to be understood, however, that also other suitable substituted benzoyl or other aroyl acetic acid derivatives may successfully be used, yielding also valuable novel esters with remarkable insecticidal properties.

This application is a continuation-in-part of my copending application Serial No. 515,210, filed June 13, 1955, now abandoned.

I claim:
Phosphoric acid esters of the general formula

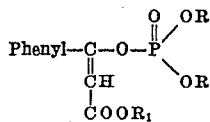

wherein R and $R_1$ stand for a lower alkyl radical.

References Cited in the file of this patent
UNITED STATES PATENTS
2,685,552     Stiles _____ Aug. 3, 1954

OTHER REFERENCES
Naturwissenschaften, vol. 42, p. 415, 1955.
Chem. Abstracts, vol. 42, pp. 4523–4524.